Jan. 18, 1927.
E. F. ROBERTS
1,614,992
MOTOR VEHICLE
Filed May 12, 1923
2 Sheets-Sheet 1
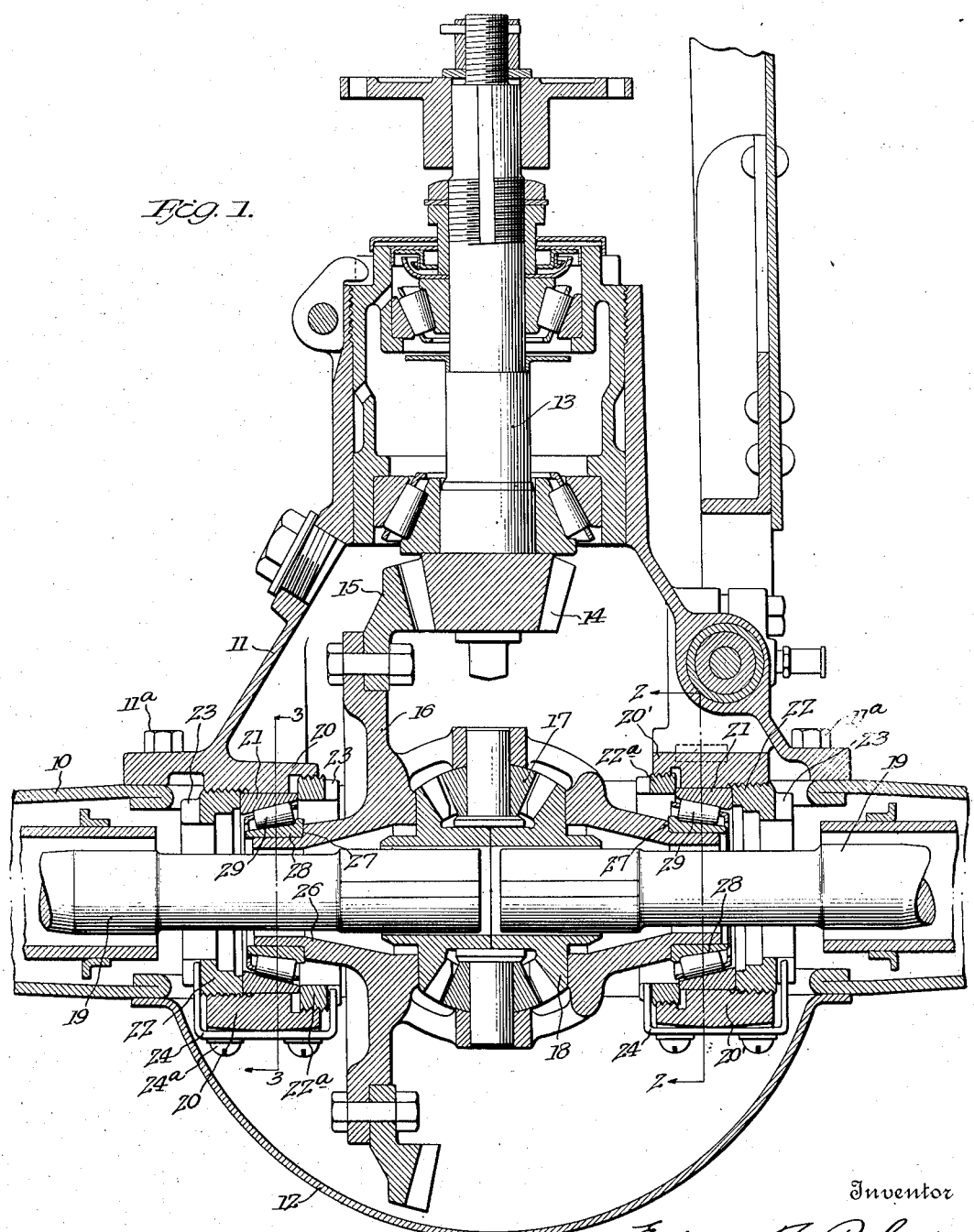
Inventor
Edward F. Roberts,
By Watson, Coit, Morse & Grindle
Attorney

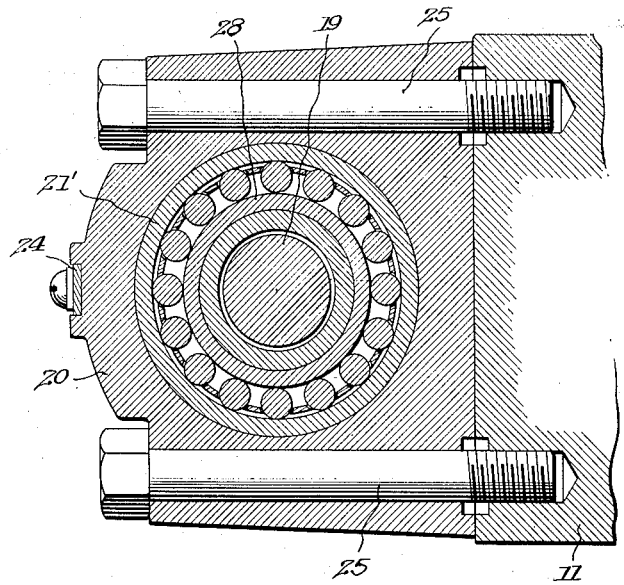
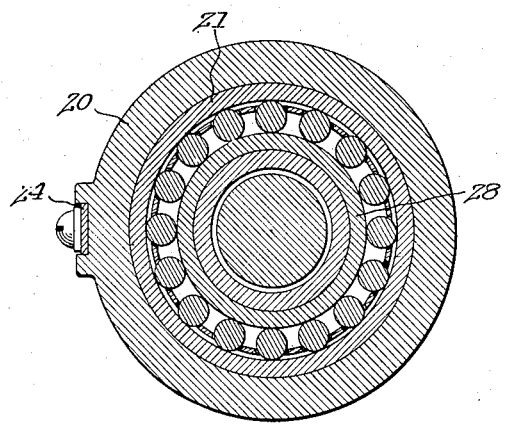

Patented Jan. 18, 1927.

1,614,992

UNITED STATES PATENT OFFICE.

EDWARD F. ROBERTS, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 12, 1923. Serial No. 638,590.

The present invention relates to motor vehicles and more particularly to the rear axle construction thereof.

The invention has particular reference to the arrangement and method of mounting the bearings which support the differential cage of the axle.

The principal object is to provide a construction in which the race rings of these bearings are so supported that the possibility of any distortion of said rings is eliminated.

Heretofore, it has been common practice to support the outer race rings of the bearings in a divided housing, the members of which are clamped together by screws, and I have discovered that the clamping of these members on the race rings sometimes produces slight distortions of the race rings. Even a very slight initial distortion of a race ring is sufficient to cause uneven wear of the bearing surfaces, thereby rapidly increasing the non-trueness of the races and the looseness of the bearings, which looseness cannot be remedied by adjustment. Such distortion with its resulting wear also renders the bearing noisy.

In accordance with the present invention, the outer race rings of the bearings which support the differential cage have a close but non-clamping fit in seats provided in integral blocks rigid with the axle casing. In order that the differential cage may be readily removed, it is preferred to make one of the blocks removable. Thus, when the axle sections are disconnected, the differential cage can be removed by unfastening the displaceable bearing block. The inner race rings of the bearings are supported on annular seats provided on the differential cage.

The entire construction eliminates any possibility of the race rings becoming distorted and at the same time is simple, strong, easy of adjustment and permits rapid assembling of the parts.

Other objects and features of novelty will be apparent from the following description taken in connection with the drawings, in which:

Figure 1 is a horizontal sectional view through the central portion of a rear axle construction embodying the present invention.

Figure 2 is a sectional elevation taken substantially on the line 2—2 of Figure 1.

Figure 3 is a sectional elevation taken substantially on the line 3—3 of Figure 1.

Referring to the drawings, the numeral 10 designates the axle casing or housing which may be of any accepted construction, having the usual front and rear openings at the central portion thereof. The rear opening is closed by a substantially semispherical plate 12 which is secured to the housing and the front opening is closed by a frame 11 which is secured to the casing by bolts, such as indicated at 11ª. This frame carries the stub shaft 13 journaled in tapered roller bearings supported in a cage which is adjustably secured in said frame. A beveled pinion 14, non-rotatably secured to the shaft 13, meshes with the large bevel ring gear 15 bolted to the differential cage 16, which may be of any accepted construction. As shown, the cage carries the bevel planet pinions 17 which mesh with the bevel sun gears 18, non-rotatably mounted on the ends of the axle shafts 19. These parts are well known and hence need no further description.

The present invention relates particularly to the bearings supporting the differential cage. Heretofore, the outer race rings of these bearings have been mounted in housings, at least one of which was divided into two sections which were clamped around the race ring by cap screws. As heretofore stated, this construction is liable to distort the outer race ring when the cap screws are tightened to clamp the members of the housing on the ring, and it is this liability to distortion that the present invention is designed to eliminate. The construction whereby this object is accomplished will now be described.

Rigid with the cover plate 11 is a bearing block or lug 20 formed with a cylindrical bore coaxial with the axle casing 10, which bore has its outer portions threaded. An outer race ring 21 has a cylindrical periphery which is positioned within said bore with a tight but non-binding fit. This ring is prevented from longitudinal or axial movement by means of the adjusting rings 22 and 22ª disposed on opposite sides of the ring respectively and screwed into the said threaded portions of the bore. Each of the rings 22 and 22ª has a number of notches 23 in its outer side adapted to receive a locking dog 24 detachably secured to the block 20 as by means of the cap screws 24ª.

Thus, by manipulating the adjusting rings 22 and 22ª, the race ring may be adjusted axially of the axle, and locked in any desired position of adjustment by the dog 24 engaging the notches 23.

The outer race ring 21 on the other side of the differential cage is supported in a bearing block 20' and adjusted and confined against axial movement by the adjusting rings 22 and 22ª in exactly the same manner as the race ring 21, previously described. In order to aid in assembling the parts, it is preferred to make one of the bearing blocks removable and in the form of the invention illustrated, the block 20' is detachably but rigidly secured to the frame 11 by cap screws 25. Thus, the outer race rings 21 of both bearings are mounted in solid integral bearing blocks, thereby avoiding any possibility that the race rings will be distorted by being clamped or wedged.

Rigid with the differential cage and projecting from each side thereof is a hub 26, the outer portion of which is reduced to form an inner annular shoulder 27. The inner race rings 28 of the bearing supporting the cage are seated on the cylindrically reduced end portions of the hubs 26 and abutting the annular shoulders 27. The bearing surfaces of the inner and outer race rings are conical, and tapered rollers 29 are interposed between said surfaces and positioned with their large ends next to the differential cage. Thus, the thrust from the cage to either of the bearings is transmitted through the shoulder 27 to the inner race rings thereof. The outer race rings, as previously stated, are adjusted and held against axial movement whereby the cage is properly supported for rotation.

In assembling the differential cage, the hub thereof next the large gear is inserted in the bearing block 20 and then the bearing block 20', which previously has been placed over the other hub, is secured to the frame 11 by the cap screws 25.

Although an embodiment of the invention has been described in detail, it is to be understood that the invention is not thus limited, but includes modifications and changes which come within the scope of the appended claims.

What I claim to be new and desire to secure by Letters Patent is:

1. In a rear axle structure for motor vehicles, in combination, an axle casing, integral non-split cylindrical bored bearing blocks rigid with said casing and coaxial therewith, an outer race ring seated in the bore of each block with a close but non-binding fit, means for positively adjusting said race rings either way axially and securing them in adjusted positions, a differential cage between said rings having a hub on each side thereof extending into said rings coaxially thereof, the end portions of said hubs being cylindrical, an inner race ring having a cylindrical bore fitted to the end portion of each hub, said inner and outer race rings having conical bearing surfaces, and tapered rollers between said surfaces.

2. In a rear axle structure for motor vehicles, in combination, an axle casing, a pair of spaced integral non-split bearing blocks rigid with the casing and having bores coaxial with said casing and each of said bores having threaded portions at both ends; an outer race ring seated centrally in each of said bores with a close but non-binding fit, exteriorly threaded adjusting rings screwed in the threaded portions of said bores preventing axial movement of said race rings, means to lock said threaded rings in adjusted positions, a differential cage between said blocks having a hub projecting from each side thereof, into said blocks, an inner race ring seated on the end portion of each of said hubs, said inner and outer race rings having conical bearing surfaces, and tapered rollers between said surfaces.

3. In a rear axle structure for motor vehicles, in combination, an axle casing having a central front opening, a cover frame secured to said casing over said opening having an integral bored lug, a bored block detachably secured to said frame, the bores of said lug and block being substantially coaxial with said casing and each of said bores having a central cylindrical portion and threaded outer portions, an outer race ring seated in the cylindrical portion of each of said bores, exteriorly threaded adjusting rings screwed in the threaded portions of said bores preventing axial movement of said race rings, means for securing said threaded rings in adjusted positions, a differential cage between said lug and block having a hub projecting from each side thereof into said lug and block respectively having cylindrical end portions, an inner race ring seated on the cylindrical portion of each hub, and rollers between said inner and outer race rings.

4. In a rear axle structure for motor vehicles, in combination, an axle casing having a central front opening, a cover frame secured to said casing over said opening having an integral bored lug, a bored block bolted to said frame, the bores of said lug and block being substantially coaxial with said casing and each of said bores having a central cylindrical portion and threaded outer portions, an outer race ring seated in the cylindrical portion of each of said bores, exteriorly threaded adjusting rings screwed in the threaded portions of said bores preventing axial movement of said race rings, means for securing said threaded rings in adjusted positions, a differential cage between said lug and block having a hub projecting from each side thereof into said lug and block respectively, the end portions of said hubs being reduced to form inner annular shoulders and said end portions being cylindrical, an inner race ring seated on the cylindrical portion of each hub and abutting the annular shoulder thereof, and rollers between said inner and outer race rings.

5. In a rear axle structure for motor vehicles, in combination, an axle casing having a central front opening a cover frame secured to the casing over said opening having an integral bored lug, a bored block bolted to said frame, the bores of said lug and block being substantially coaxial with said casing and each of said bores having a central cylindrical portion and threaded outer portions, an outer race ring seated in the cylindrical portion of each of said bores, exteriorly threaded adjusting rings screwed in the threaded portions of said bores preventing axial movement of said race rings, said threaded rings having notches in their outer sides, dogs mounted on said lug and block, engaging said notches to hold said rings in adjusted positions, a differential cage between said lug and block having a hub projecting from each side thereof into said lug and block respectively, the end portions of said hubs being reduced to form inner annular shoulders and said end portions being cylindrical, an inner race ring seated in the cylindrical portion of each of said hubs and abutting the annular shoulder thereof, said inner and outer race rings having conical bearing surfaces, and tapered rollers between said surfaces.

In testimony whereof I hereunto affix my signature.

EDWARD F. ROBERTS.